(12) United States Patent
Wada et al.

(10) Patent No.: US 6,172,601 B1
(45) Date of Patent: Jan. 9, 2001

(54) THREE-DIMENSIONAL SCOPE SYSTEM WITH A SINGLE CAMERA FOR VEHICLES

(75) Inventors: Jyoji Wada, Yokohama; Masami Takahashi, Zushi, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/440,139

(22) Filed: Nov. 15, 1999

(30) Foreign Application Priority Data

Nov. 26, 1998 (JP) .................................................. 10-335722

(51) Int. Cl.[7] ...................................................... B60Q 1/00
(52) U.S. Cl. ........................ 340/436; 340/435; 340/903; 340/937; 348/148; 348/149
(58) Field of Search ................................... 340/436, 435, 340/903, 937; 348/135, 148, 149

(56) References Cited

U.S. PATENT DOCUMENTS

| | | | |
|---|---|---|---|
| 4,214,266 | * | 7/1980 | Myers .................................... 358/108 |
| 4,872,051 | * | 10/1989 | Dye ........................................ 358/103 |
| 5,341,437 | * | 8/1994 | Nakayama ................................. 382/1 |
| 5,475,494 | * | 12/1995 | Nishida et al. ....................... 356/4.01 |
| 5,576,724 | * | 11/1996 | Fukatsu et al. ........................... 345/7 |
| 5,612,686 | * | 3/1997 | Takano et al. ......................... 340/903 |
| 5,617,085 | * | 4/1997 | Tsutsumi et al. ..................... 340/903 |
| 5,646,614 | * | 7/1997 | Abersfelder et al. ............. 340/932.2 |
| 5,689,249 | * | 11/1997 | Sakamoto et al. .................... 340/901 |
| 5,850,254 | * | 12/1998 | Takano et al. ........................ 348/148 |
| 5,889,878 | * | 3/1999 | Togashi ................................ 382/103 |
| 5,949,331 | * | 9/1997 | Schofield et al. .................... 340/461 |

* cited by examiner

Primary Examiner—Jeffery A. Hofsass
Assistant Examiner—Phung Nguyen
(74) Attorney, Agent, or Firm—Lowe Hauptman Gopstein Gilman & Berner, LLP

(57) ABSTRACT

A single video camera is installed on a vehicle body. Two still pictures of an obstacle are obtained at different vehicle traveling positions. A picture memory stores the obtained still pictures. A feature point extracting section extracts at least one feature point from the data of the stored still pictures. A three-dimensional coordinate data calculating section calculates the distance from the vehicle body to the feature point and the height of the feature point based on the positional data of the feature point on the screen and the vehicle traveling distance data. A stereoscopic picture forming section forms a stereoscopic picture image of a detected obstacle based on three-dimensional coordinate data of the feature points. A monitor displays a plan view or a side view showing the relationship between the vehicle body and the obstacle, thereby allowing a driver to directly grasp the distance of the obstacle. When the obstacle is located within a predetermined distance from the vehicle body, the driver is cautioned against a predictable collision by the alarm sound or related image.

21 Claims, 5 Drawing Sheets

STILL PICTURE OF
RIGHT CAMERA 7

STILL PICTURE OF
LEFT CAMERA 8

THREE-DIMENSIONAL SCOPE SYSTEM WITH A SINGLE CAMERA FOR VEHICLES

BACKGROUND OF THE INVENTION

The present invention relates to a three-dimensional scope system with a single camera for vehicles. More particularly, the three-dimensional scope system of the present invention is capable of obtaining a distance between a target and a vehicle body based on data of two still pictures of the target obtained at different vehicle traveling positions by using a single camera.

Conventionally, two stereo cameras, which are mounted on a vehicle body, simultaneously perform the image pickup operation of an obstacle. Data of two still pictures obtained from the right and left cameras are used to detect corresponding or congruent points and to calculate the position of the obstacle based on the principle of triangulation.

FIGS. 7A to 7C schematically illustrate a conventional method for measuring the position of an obstacle by using stereo cameras mounted on a vehicle body. In FIG. 7A, a right stereo camera 7 and a left stereo camera 8, constituting a set of two stereo cameras, are installed on a front or rear side of a vehicle body 4. FIGS. 7B and 7C respectively show two still pictures obtained by the right stereo camera 7 and the left camera 8. An image processing apparatus analyzes the resultant data of two still pictures to obtain corresponding or congruent points. The distance between the vehicle body 4 and the obstacle 5 is calculated. When the distance between the vehicle body 4 and the obstacle 5 becomes less than a predetermined value, a buzzer is actuated or warning sound is generated to caution a driver against the obstacle.

This kind of conventional stereo camera system is disadvantageous in that it requires two cameras and therefore the system cost increases.

SUMMARY OF THE INVENTION

To solve the above-described problems of the conventional stereo camera system, the present invention has an object to form and display a stereoscopic picture image of the obstacle based on the data of two still pictures of the obstacle successively obtained by a single video camera mounted on a vehicle body.

In order to accomplish this and other related objects, the present invention provides a three-dimensional scope system with a single camera for vehicles. The three-dimensional scope system of the present invention comprises a single camera mounted on a vehicle body for successively obtaining two still pictures of a predetermined target at different vehicle traveling positions, a means for obtaining a vehicle traveling distance between the different vehicle traveling positions, a means for obtaining a positional change amount of at least one objective point of the target on a camera screen, and a means for obtaining three-dimensional coordinate data of the objective point based on the vehicle traveling distance and the positional change amount of the objective point on the screen. With this arrangement, the present invention makes it possible to obtain a stereoscopic picture image by using a single camera.

Furthermore, it is preferable that the three-dimensional scope system of the present invention further comprises a means for forming a stereoscopic picture image based on the three-dimensional coordinate data of the objective point, and a monitor for displaying a resultant stereoscopic picture image. With this arrangement, the present invention makes it possible to display the target in a stereoscopic manner by using a single camera.

Furthermore, it is preferable that the means for forming the stereoscopic picture image includes a means for changing a viewpoint. With this arrangement, the present invention makes it possible to flexibly display a stereoscopic picture image of the target to be image picked up from an arbitrary viewpoint.

Furthermore, it is preferable that the three-dimensional scope system of the present invention further comprises a means for generating the alarm when an obstacle is detected within a predetermined distance from the vehicle body. With this arrangement, the present invention makes it possible to caution a driver against a collision predictable from the approaching obstacle.

Furthermore, the present invention provides a processing method for a three-dimensional scope system with a single camera mounted on a vehicle body. The method comprising a first step of causing the single camera to successively obtain two still pictures of a predetermined target at different vehicle traveling positions, a second step of obtaining a positional change amount of at least one objective point of the target on a camera screen, a third step of obtaining three-dimensional coordinate data of the objective point based on a vehicle traveling distance between the different vehicle traveling positions and also based on the positional change amount of the objective point on the screen, and a fourth step of forming a stereoscopic picture image based on the three-dimensional coordinate data of the objective point.

Preferably, the processing method of the present invention further comprises a step of generating the alarm when an obstacle is detected within a predetermined distance from the vehicle body.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
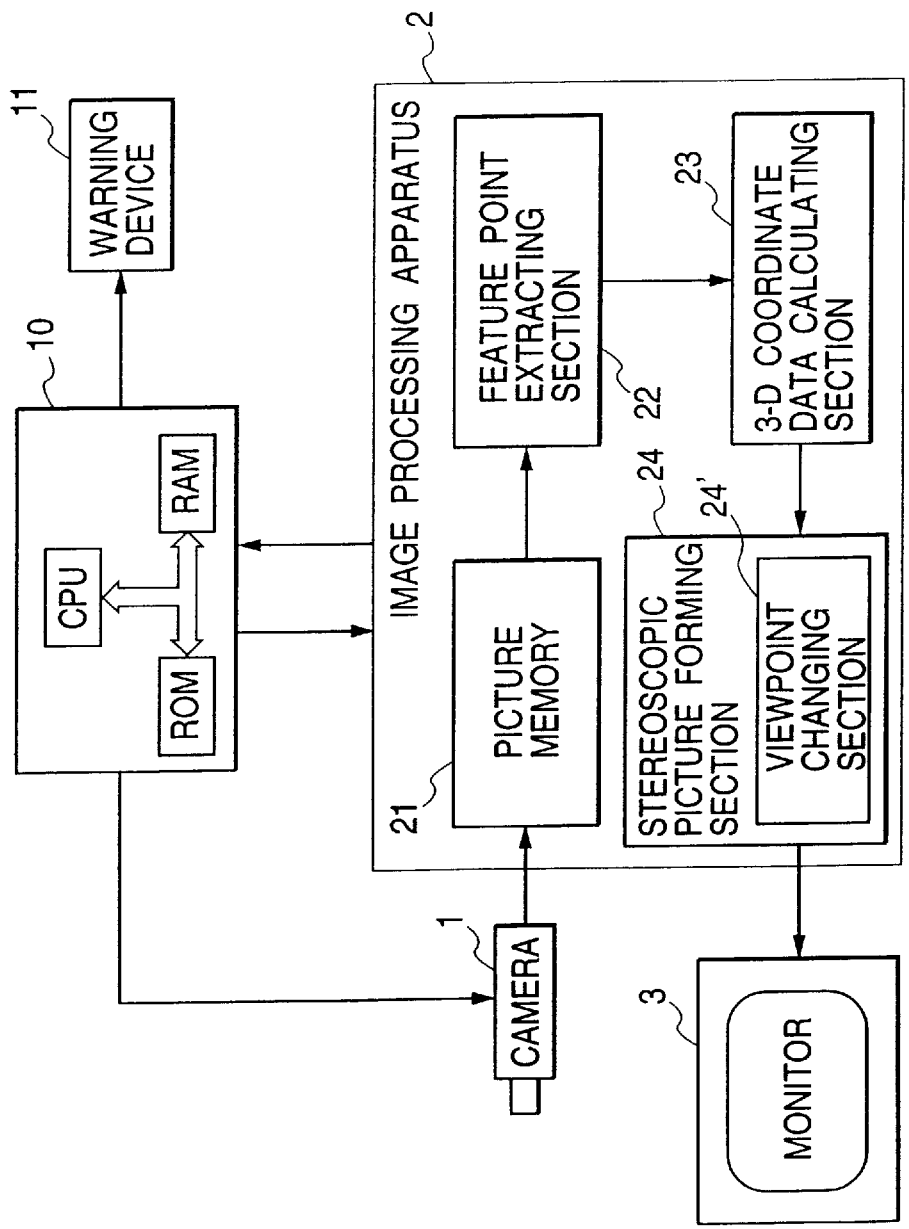
FIG. 1 is a schematic view showing a three-dimensional scope system with a single camera for vehicles in accordance with a preferred embodiment of the present invention.

Hereinafter, a preferred embodiment of the present invention will be explained with reference to FIGS. 1 to 6. Identical parts are denoted by the same reference numerals throughout the views.

A preferred embodiment of the present invention is a three-dimensional scope system with a single camera for vehicles. According to this three-dimensional scope system, a single rearview camera is mounted on a vehicle body. The rearview camera obtains two still pictures of a target successively at an appropriate time interval. The positional change of a corresponding point is calculated with reference to the data of two obtained still pictures. The detected obstacle data, such as distance, height and others, are calculated based on the positional change data on a screen and an actual vehicle traveling distance. A monitor displays the detected obstacle data in a stereoscopic manner. When the obstacle is located within a predetermined distance from the vehicle body, the alarm is generated to caution a driver against a predictable collision.

FIG. 1 is a schematic view showing a three-dimensional scope system with a single camera installed on a vehicle body in accordance with a preferred embodiment of the present invention. In FIG. 1, a video camera 1 is a rearview camera installed on a vehicle body. The video camera 1 is a digital video camera having the resolution equivalent to or higher than 800 pixels×600 pixels. A control unit 10, including a CPU and related memories (ROM, RAM, etc), is connected to control the image pickup operation of the video camera 1.

Each still picture, obtained through the image pickup operation of the video camera 1, is sent to an image processing apparatus 2 which is connected to the video camera 1. The image processing apparatus 2 analyzes the data of still pictures obtained by the video camera 1 to form a stereoscopic picture image. More specifically, the image processing apparatus 2 comprises a picture memory 21, a feature point extracting section 22, a three-dimensional coordinate data calculating section 23, and a stereoscopic picture forming section 24.

The picture memory 21 serves as a memory device for storing the digital data of still pictures obtained by the video camera 1. The feature point extracting section 22 serves as a means for extracting a feature point from the still picture of an obstacle based on the digital data stored in the picture memory 21. The three-dimensional coordinate data calculating section 23 serves as a means for calculating the position of the extracted feature point in a three-dimensional coordinate system. The stereoscopic picture forming section 24 serves as a means for forming a plan view or a side view based on the three-dimensional coordinate data obtained by three-dimensional coordinate data calculating section 23. The stereoscopic picture forming section 24 includes a viewpoint changing section 24' for forming a stereoscopic picture image to be picked up from an arbitrary viewpoint.

A monitor 3 is connected to the image processing apparatus 2. The monitor 3 displays the stereoscopic picture image produced from the image processing apparatus 2. The control unit 10 performs the data communication with the image processing apparatus 2 and activates a warning device 11 based on the result of collision prediction.

Figure 2A:
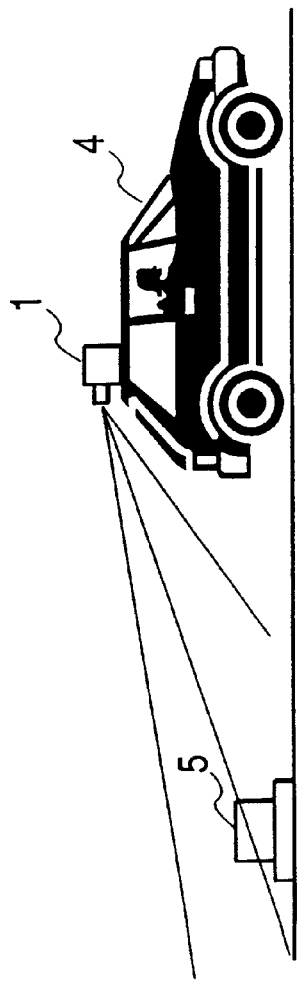
FIG. 2A is a side view showing the relationship between an obstacle and a rearview camera mounted on a vehicle body.
Figure 2B:
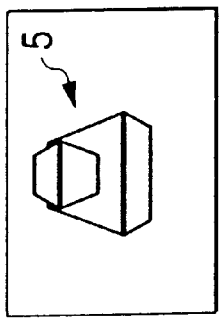
FIG. 2B is a view showing a still picture obtained though the image pickup operation of the rearview camera mounted on the vehicle body.
Figure 2C:
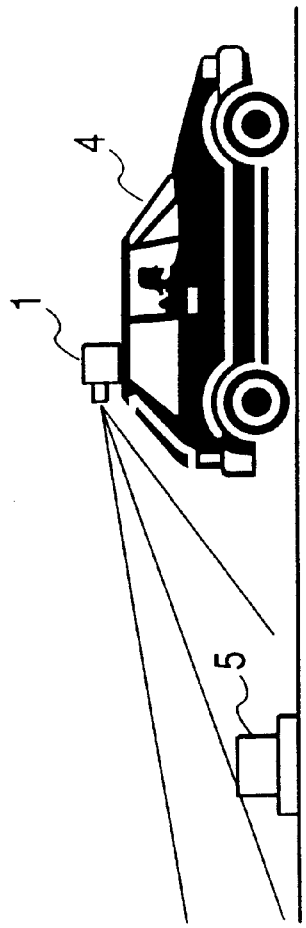
FIG. 2C is a side view showing the relationship between an obstacle and a rearview camera mounted on a vehicle body at a different vehicle traveling position.
Figure 2D:
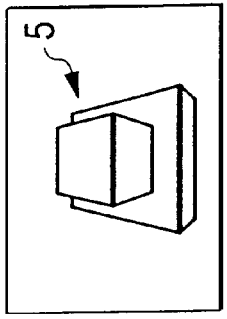
FIG. 2D is a view showing a still picture obtained though the image pickup operation of the rearview camera mounted on the vehicle body at the different vehicle traveling position.

FIGS. 2A to 2D cooperatively illustrate the operation for successively obtaining still pictures of an obstacle by using the three-dimensional scope system with a single camera installed on a vehicle in accordance with the preferred embodiment of the present invention. FIG. 2A shows a traveling position where the video camera 1 mounted on a vehicle body 4 performs the image pickup operation of the obstacle 5. FIG. 2B shows a still picture of the obstacle 5 obtained at the traveling position shown in FIG. 2A. FIG. 2C shows a different traveling position where the vehicle body 4 approaches the obstacle 5 more closely. FIG. 2D shows a still picture of the obstacle 5 obtained at the traveling position shown in FIG. 2C.

Figure 3:
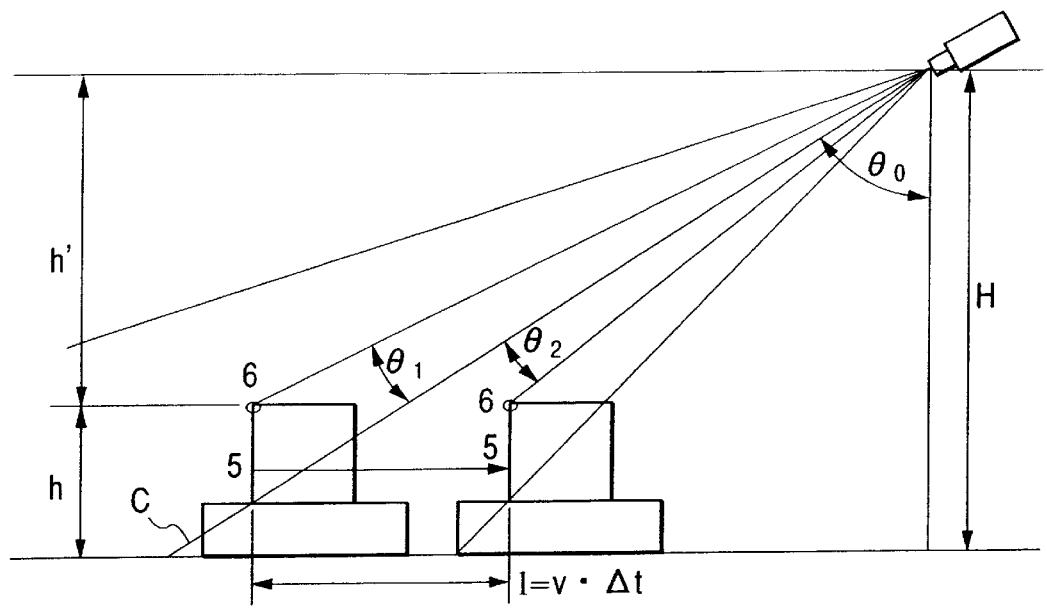
FIG. 3 is a view illustrating the measurement of the three-dimensional scope system with a single camera for vehicles in accordance with the preferred embodiment of the present invention.
Figure 4:
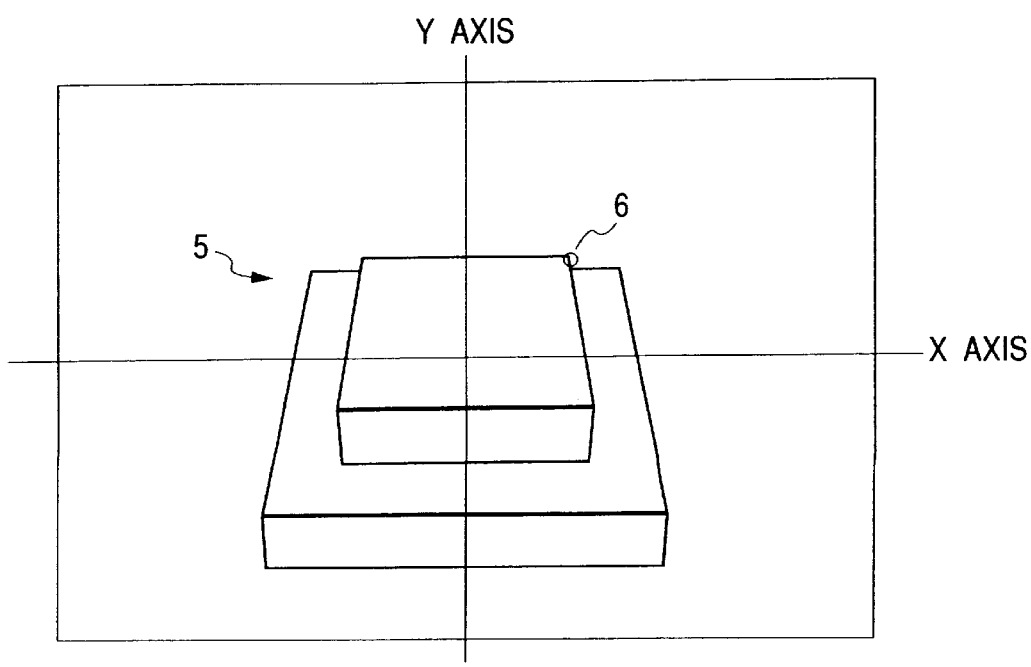
FIG. 4 is a view showing a displayed picture image of an obstacle which is formed by the three-dimensional scope system with a single camera in accordance with the preferred embodiment of the present invention.

FIG. 3 shows an angular change of the video camera 1 corresponding to two successive image pickup operations of the obstacle 5. In FIG. 3, "H" represents the height of the video camera 1 measured from a ground level. θ0 represents an angle between the optical axis C of video camera 1 and the vertical line. "l" represents a vehicle traveling distance in the backward direction. Each of "H", θ0 and "l" is a known parameter. At the first image pickup operation, a feature point 6 of the obstacle 5 deviates by an angle θ1 with respect to the optical axis C of the video camera 1. At the second image pickup operation, the feature point 6 of the obstacle 5 deviates by an angle θ2 with respect to the optical axis C of the video camera 1. Furthermore, "h" represents the height of the feature point 6 of the obstacle 5, and h' represents a vertical distance from the video camera 1 to the feature point 6 of the obstacle 5. Both of h and h' are unknown parameters. FIG. 4 shows a still picture of the obstacle 5 displayed on the screen of the monitor 3. The feature point 6 is a singular point of the picture, such as an apex of a solid body, appearing on the screen.

According to the preferred embodiment of the present invention, the above-described three-dimensional scope system operates in the following manner.

Figure 5:
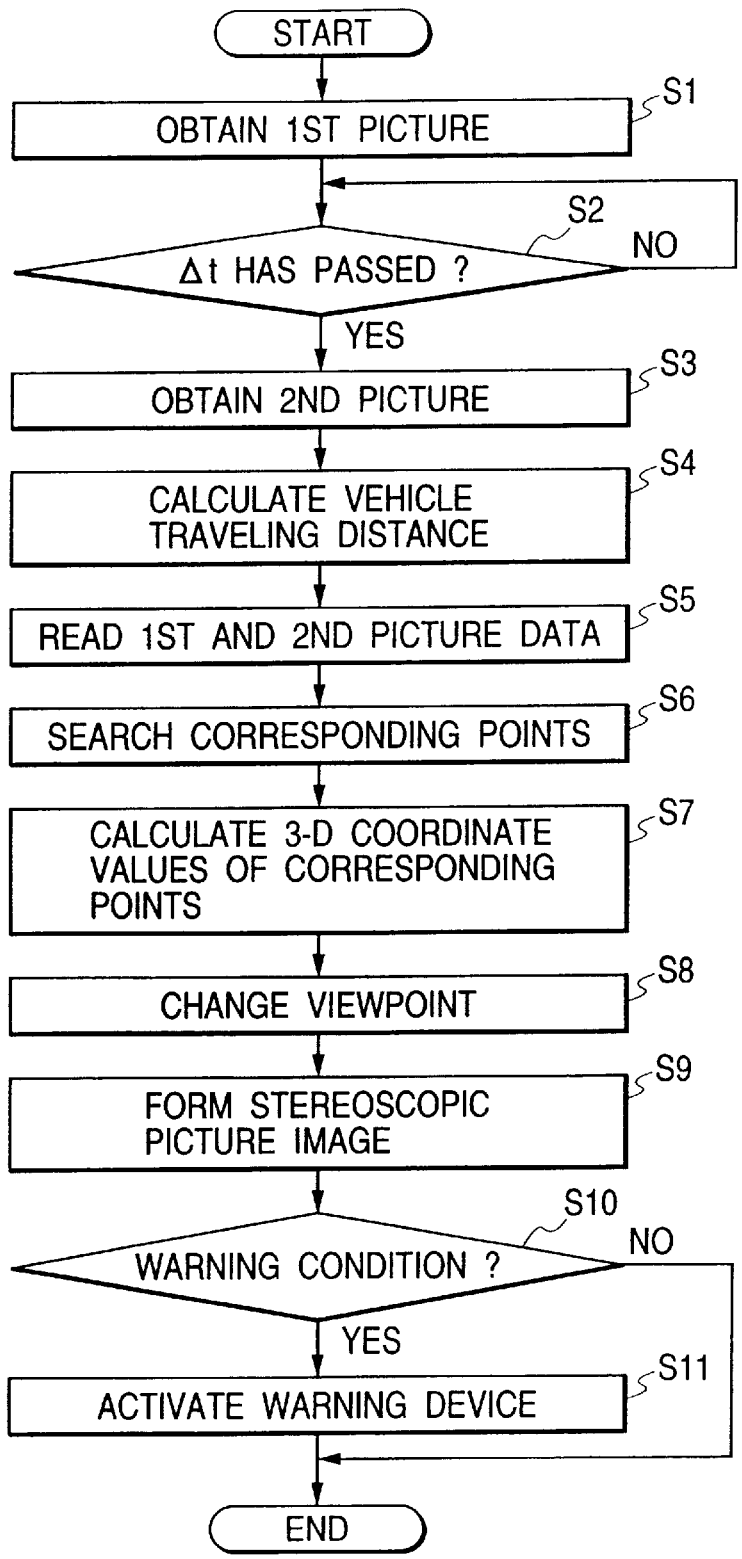
FIG. 5 is a flowchart showing the operation of the three-dimensional scope system with a single camera in accordance with the preferred embodiment of the present invention.
Figure 6:
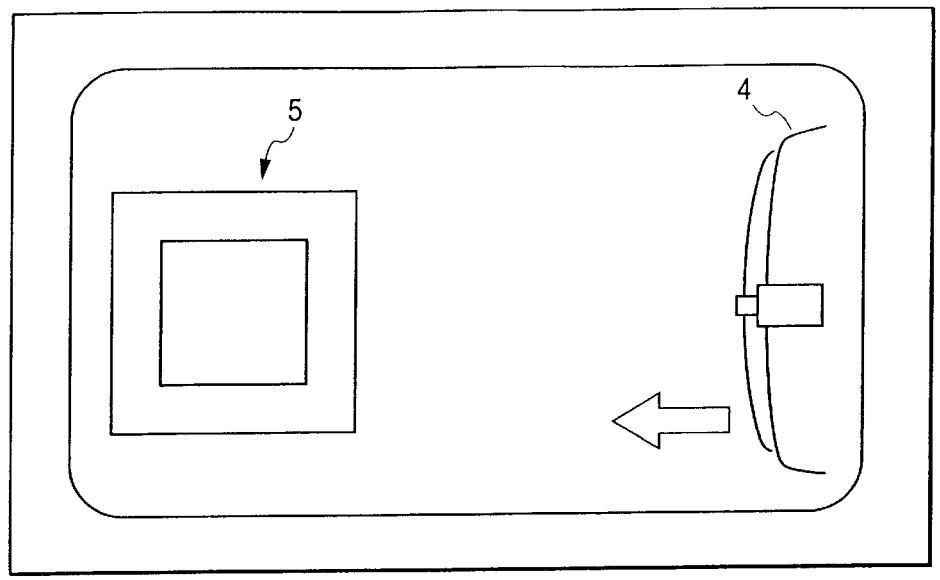
FIG. 6 is a view showing a displayed picture image of the obstacle seen from above which is formed by the three-dimensional scope system with a single camera in accordance with the preferred embodiment of the present invention.
Figure 7A:
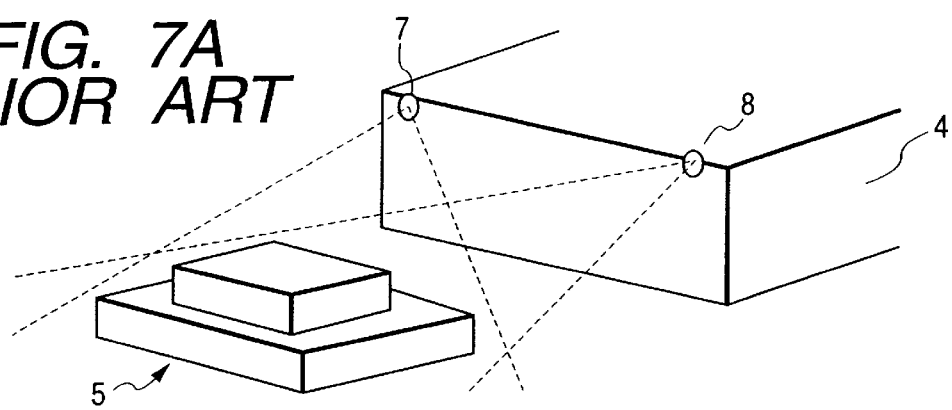
FIGS. 7A to 7C are views illustrating an obstacle detection in accordance with a conventional stereo camera system.
Figure 7B:
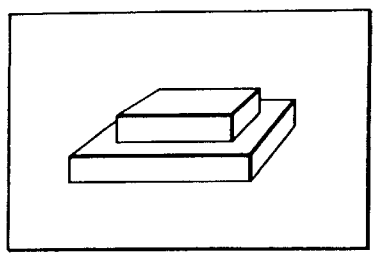
Figure 7C:
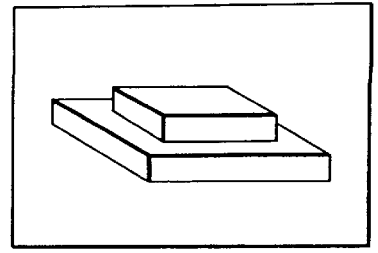

FIG. 5 is a flowchart showing the operation of the three-dimensional scope system in accordance with the preferred embodiment of the present invention.

The video camera 1 is mounted on the vehicle body 4 and directed to the rearward of the vehicle body 4 (refer to FIG.

2A). In step S1, the control unit 10 controls the video camera 1 to perform the image pickup operation to obtain the still picture shown in FIG. 2B. The still picture shown in FIG. 2B is referred to as first picture. Then, in step S2, it is checked whether a predetermined time Δt has passed or not. During this time interval, the vehicle moves backward and approaches the obstacle 5 as shown in FIG. 2C. Then, in step S3, video camera 1 again performs the image pickup operation to obtain the still picture shown in FIG. 2D. The still picture shown in FIG. 2D is referred to as second picture.

The picture memory 21 stores both the first picture and the second picture. In step S4, the control unit 10 obtains the vehicle traveling distance "l" based on the traveling speed "v" of the vehicle body 4 and the time interval Δt between two image pickup operations.

Then, in step S5, the control unit 10 causes the picture memory 21 to send the picture data stored to the feature point extracting section 22.

Then, in step S6, the control unit 10 causes the feature point extracting section 22 to extract the feature points from the first and second pictures. Namely, a predetermined number of corresponding portions are searched by comparing the first and second picture data. This kind of searching operation can be done by using the pattern match processing. Alternatively, it is possible to apply the differential processing to the picture data obtained from the video camera 1 to detect the edges of the obstacle 5. Line segments connect the detected edges to obtain a wire frame image of the obstacle 5. Then, each apex of the obtained wire frame image is designated as a feature point. This processing is repeated for each of the pictures, thereby obtaining a plurality of feature points. Based on the comparison between the feature points of successively obtained still pictures, closest feature points are designated as corresponding or congruent points of two still pictures.

Then, in step S7, the control unit 10 causes the three-dimensional coordinate data calculating section 23 to obtain the three-dimensional coordinate data representing the feature points.

Hereinafter, the method for calculating the three-dimensional coordinate data of the feature points will be explained with reference to FIG. 3. The three-dimensional coordinate data of the feature points are obtained based on the positional change amount of the corresponding points on the screen and also based on the vehicle traveling speed.

For simplifying the explanation, it is assumed that the obstacle 5 is positioned on a central axis (i.e., Y axis) of the screen. The vehicle traveling distance "l" during two consecutive image pickup operations is expressed by the following equation.

$$l = v \cdot \Delta t$$

where "v" represents the traveling speed of the vehicle body 4 and "Δt" represents the time interval between two consecutive image pickup operations.

Meanwhile, a distance l1 represents a horizontal distance from the video camera 1 to the feature point 6 of the obstacle 5 in the first image pickup operation. Similarly, a distance l2 represents a horizontal distance from the video camera 1 to the feature point 6 of the obstacle 5 in the second image pickup operation. These distances l1 and l2 are expressed by the following equations.

$$l1 = (H-h) \cdot \tan(\theta 0 + \theta 1)$$

$$l2 = (H-h) \cdot \tan(\theta 0 + \theta 2)$$

where "H" represents the height of the video camera 1, "h" represents the height of the obstacle 5, θ0 represents the angle of the optical axis C of the video camera 1, θ1 represents the deviation angle of the feature point 6 with respect to the optical axis C in the first image pickup operation, and θ2 represents the deviation angle of the feature point 6 with respect to the optical axis C in the second image pickup operation.

As a value (l1−l2) represents the vehicle traveling distance, the following relationship is established.

$$l = v \cdot \Delta t = l1 - l2$$

When L represents a constant determined by the screen size, the Y-axis coordinate value of the feature point 6 can be expressed in the following manner.

$$y1 = L \tan \theta 1, \quad y2 = L \tan \theta 2$$

Accordingly, θ1 and θ2 are expressed in the following manner.

$$\theta 1 = \tan^{-1}(y1/L)$$

$$\theta 1 = \tan^{-1}(y2/L)$$

In other words, the deviation angles θ1 and θ2 can be obtained from the Y-axis coordinate values. The height "h" of the feature point 6 is expressed in the following manner.

$$h = H - (v \cdot \Delta t)/(\tan(\theta 0 + \theta 1) - \tan(\theta 0 + \theta 2))$$

When the feature point 6 is not located on the Y axis, it is desirable to shift or project the feature point 6 on the Y axis and then to obtain the X-axis coordinate value of the feature point. When "d" represents a distance from the video camera 1 to the feature point projected on the Y axis and "x1" represents the X-axis coordinate value of the feature point 6 on the screen, a lateral or horizontal distance "a" from the central axis is expressed by the following equation.

$$a = d \cdot x1/L$$

$$(d^2 = (l0+l1)^2 + (H-h)^2, \ lo = (H-h) \tan \theta 0)$$

Accordingly, all of the horizontal distance "l1" from the video camera 1 to the objective point, the height "h" of the objective point, and the lateral distance "a" can be obtained. Thus, it becomes possible to draw a stereoscopic picture image.

Based on the coordinate values of the feature points, it becomes possible to create or form a stereoscopic picture image similar to those disclosed in FIGS. 2B, 2D and 4 which are obtained (i.e., image picked up) by the video camera 1. However, to surely grasp the distance, it is also desirable to form and display another picture image showing the side of the vehicle body 4 as shown in FIG. 3, or showing the top of the vehicle body 4 as shown in FIG. 5.

According to this embodiment, the viewpoint changing section 24' is provided to form a stereoscopic picture image to be picked up from an arbitrary viewpoint. Namely, in step S8, the control unit 10 causes the viewpoint changing section 24 to adjust or optimize the viewpoint.

With the function of the viewpoint changing section 24', it becomes possible to shift or move the viewpoint to any other place, such as the infinite point or the driver's position, from the video camera 1. As a result, it becomes possible to emphasize the effect of stereoscopic image creation. By utilizing such a flexible image creation, it becomes possible to directly and accurately grasp the distance from the vehicle body 4 to the obstacle 5.

Then, in step S9, the control unit 10 causes the stereoscopic picture forming section 24 to form or create a finalized stereoscopic picture image which is displayed on the monitor 3.

When the vehicle body 4 moves backward, the control unit 10 checks the positional relationship between the vehicle body 4 and obstacle 5 based on the three-dimensional information of them. When the distance between the vehicle body 4 and obstacle 5 becomes shorter than a predetermined value (i.e., YES in step S10), the warning device 11, such as a buzzer, is actuated to caution a driver against a collision predictable from the approaching obstacle 5 (step S11). Instead of using the buzzer, it is preferable to generate warning sound or turn on a red indicator lamp.

According to the above-described embodiment, only two still pictures are used to create or form a stereoscopic picture image. However, when the image processing apparatus has a sufficiently high speed in the image processing, it is possible to obtain animated or dynamic picture images by speedily converting continuously obtained still picture data into serial stereoscopic picture images.

As apparent from the foregoing description, the preferred embodiment of the present invention provides a three-dimensional scope system with a single camera for vehicles. According to this three-dimensional scope system, a single video camera is mounted on a vehicle body. The single video camera obtains two still pictures of a target successively at an appropriate time interval. The positional change of corresponding points are calculated with reference to the data of two still pictures thus obtained. The detected obstacle data, such as distance, height and others, are calculated based on the positional change data on a screen and an actual vehicle traveling distance. A monitor displays the detected obstacle data in a stereoscopic or three-dimensional manner. When the obstacle is located within a predetermined distance from the vehicle body, the warning device is activated to caution a driver against a predictable collision. Accordingly, it becomes possible to measure the distance of the obstacle by using a single camera. The collision prediction can be performed at a low cost.

As explained in the foregoing description, the present invention provides a three-dimensional scope system with a single camera for vehicles. The three-dimensional scope system of the present invention comprises a single camera mounted on a vehicle body for successively obtaining two still pictures of a predetermined target at different vehicle traveling positions, a means for obtaining a vehicle traveling distance between the different vehicle traveling positions, a means for obtaining a positional change amount of at least one objective point of the target on a camera screen, and a means for obtaining three-dimensional coordinate data of the objective point based on the vehicle traveling distance and the positional change amount of the objective point on the screen. The present invention makes it possible to measure the obstacle position with a simplified arrangement. It becomes possible to prevent the vehicle body from colliding with an obstacle.

Furthermore, it is preferable that the three-dimensional scope system of the present invention further comprises a means for forming a stereoscopic picture image based on the three-dimensional coordinate data of the objective point, and a monitor for displaying a resultant stereoscopic picture image. With this arrangement, the present invention makes it possible to display the target in a stereoscopic manner.

Furthermore, it is preferable that the means for forming the stereoscopic picture image includes a means for changing a viewpoint. With this arrangement, the present invention makes it possible to flexibly display a stereoscopic picture image of the target to be image picked up from an arbitrary viewpoint. Thus, it becomes possible to emphasize the effect of stereoscopic image creation.

Furthermore, it is preferable that the three-dimensional scope system of the present invention further comprises a means for generating the alarm when an obstacle is detected within a predetermined distance from the vehicle body. With this arrangement, the present invention makes it possible to caution a driver against a collision predictable from the approaching obstacle.

Although the above-described embodiment provides the image processing apparatus 2 separately from the control unit 10, it is needless to say that the image processing apparatus 2 and the control unit 10 can be integrated into a single computer-based control unit. For example, all of the feature point extracting section 22, the three-dimensional coordinate data calculating section 23, and the stereoscopic picture forming section 24 can be replaced by the CPU of the control unit 10 when the CPU can operate as a means for perform the same functions thereof. In this case, the picture memory 21 functions as one of built-in memories in the control unit.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A three-dimensional scope system with a single camera for vehicles, said system comprising:
   a single camera mounted on a vehicle body for successively obtaining two still pictures of a predetermined target at different vehicle traveling positions;
   a means for obtaining a vehicle traveling distance between said different vehicle traveling positions;
   a means for obtaining a positional change amount of at least one objective point of said target on a camera screen; and
   a means for obtaining three-dimensional coordinate data of said objective point based on the vehicle traveling distance and said positional change amount of the objective point on the screen.

2. The three-dimensional scope system with a single camera in accordance with claim 1, further comprising:
   a means for forming a stereoscopic picture image based on said three-dimensional coordinate data of said objective point; and
   a monitor for displaying a resultant stereoscopic picture image.

3. The three-dimensional scope system with a single camera in accordance with claim 2,
   wherein said means for forming said stereoscopic picture image includes a means for changing a viewpoint of the stereoscopic image to obtain an image viewing the predetermined target from an arbitrary position which is different from a viewpoint of said camera at the vehicle traveling positions.

4. The three-dimensional scope system with a single camera in accordance with claim 1, further comprising a means for generating an alarm when an obstacle is detected within a predetermined distance from said vehicle body.

5. A processing method for a three-dimensional scope system with a single camera mounted on a vehicle body, said method comprising:
   a step of causing said single camera to successively obtain two still pictures of a predetermined target at different vehicle traveling positions;
   a step of obtaining a positional change amount of at least one objective point of said target on a camera screen;
   a step of obtaining three-dimensional coordinate data of said objective point based on a vehicle traveling distance between said different vehicle traveling positions and also based on said positional change amount of the objective point on the screen; and
   a step of forming a stereoscopic picture image based on said three-dimensional coordinate data of said objective point.

6. A three-dimensional scope system with a single camera for vehicles, said system comprising:
   a single camera mounted on a vehicle body for successively obtaining two still pictures of a predetermined target at different vehicle traveling positions, with an optical axis of said camera being fixed at a predetermined angle;
   a means for obtaining a vehicle traveling distance between said different vehicle traveling positions;
   a means for obtaining a positional change amount of at least one objective point of said target on a camera screen based on data obtained through image analysis applied to said two still pictures taken by said camera; and
   a means for obtaining three-dimensional coordinate data of said objective point based on the vehicle traveling distance and said positional change amount of the objective point on the screen.

7. The three-dimensional scope system with a single camera in accordance with claim 6, further comprising:
   a means for forming a stereoscopic picture image, modified from said still pictures taken by said camera, based on said three-dimensional coordinate data of said objective point; and
   a monitor for displaying a resultant stereoscopic picture image.

8. The three-dimensional scope system with a single camera in accordance with claim 7, wherein said means for forming said stereoscopic picture image includes a means for changing a viewpoint to an arbitrary position different from a viewpoint of said camera.

9. The three-dimensional scope system with a single camera in accordance with claim 6, further comprising a means for generating an alarm when an obstacle is detected within a predetermined distance from said vehicle body as a result of a distance measurement based on said three-dimensional coordinate data.

10. A processing method for a three-dimensional scope system with a single camera mounted on a vehicle body, said method comprising:
    a step of causing said single camera to successively obtain two still pictures of a predetermined target at different vehicle traveling positions, while fixing an optical axis of said camera at a predetermined angle;
    a step of obtaining a positional change amount of at least one objective point of said target on a camera screen based on data obtained through image analysis applied on said two still pictures taken by said camera;
    a step of obtaining three-dimensional coordinate data of said objective point based on a vehicle traveling distance between said different vehicle traveling positions and also based on said positional change amount of the objective point on the screen; and
    a step of forming a stereoscopic picture image based on said three-dimensional coordinate data of said objective point.

11. The processing method for a three-dimensional scope system with a single camera in accordance with claim 10, further comprising a step of generating the alarm when an obstacle is detected within a predetermined distance from said vehicle body as a result of a distance measurement based on said three-dimensional coordinate data.

12. The three-dimensional scope system with a single camera in accordance with claim 8, wherein said arbitrary position includes an infinite point or a driver's position of a vehicle.

13. The three-dimensional scope system with a single camera in accordance with claim 8, wherein said arbitrary position is selected to obtain a picture image corresponding to at least one of a plan view and a side view of said vehicle body based on said three-dimensional coordinate data.

14. The processing method for a three-dimensional scope system with a single camera in accordance with claim 10, further comprising a step of changing a viewpoint to an arbitrary position different from a viewpoint of said camera.

15. A three-dimensional scope system for vehicles, comprising:
    a single camera mounted on a vehicle body for successively obtaining two still pictures of a predetermined target at different vehicle traveling positions, with an optical axis of said camera being fixed at a predetermined angle;
    an image processing apparatus receiving said two still pictures from said single camera for analyzing data of the received still pictures to form a stereoscopic picture image; and
    a monitor connected to said image processing apparatus to display the stereoscopic picture image produced from said image processing apparatus, wherein said image processing apparatus produces three-dimensional coordinate data of an objective point of said target based on a vehicle traveling distance between said different vehicle traveling positions and a positional change amount of said objective point on a camera screen based on data obtained through image analysis applied on said two still pictures taken by said camera.

16. The three-dimensional scope system in accordance with claim 15, wherein said image processing apparatus comprises:

a picture memory for storing digital data of said still pictures received from said camera;

a feature point extracting section for extracting said objective point of said target from said still pictures based on the digital data stored in said picture memory;

a three-dimensional coordinate data calculating section for calculating a position of said objective point in a three-dimensional coordinate system; and a stereoscopic picture forming section for forming an arbitrary view of said target based on three-dimensional coordinate data obtained by said three-dimensional coordinate data calculating section.

17. The three-dimensional scope system in accordance with claim 16, wherein said stereoscopic picture forming section includes a viewpoint changing section for forming said arbitrary view from an arbitrary viewpoint different from a viewpoint of said camera.

18. The three-dimensional scope system in accordance with claim 15, further comprising a control unit for performing data communication with said image processing apparatus and activating a warning device as a result of a collision prediction based on said three-dimensional coordinate data.

19. A processing method for a three-dimensional scope system comprising:

a step of causing a single camera mounted on a vehicle body to successively perform first and second image pickup operations at a predetermined time interval $\Delta t$ to obtain first and second still pictures of a predetermined target at different vehicle traveling positions, while fixing an optical axis "C" of said camera at a predetermined angle $\theta 0$;

a step of storing data of said first and second still pictures;

a step of calculating a vehicle traveling distance "l" by multiplying a vehicle traveling speed "v" with said time interval $\Delta t$;

a step of extracting at least one feature point of said target from each of said first and second still pictures; and a step of calculating three-dimensional coordinate data representing said feature point by using the following equations, $$l = v \cdot \Delta t = l1 - l2$$

$$l1 = (H-h) \cdot \tan(\theta 0 + \theta 1)$$

$$l2 = (H-h) \cdot \tan(\theta 0 + \theta 2)$$

where l1 is a horizontal distance from said camera to said feature point in said first image pickup operation, l2 represents a horizontal distance from said camera to said feature point in said second image pickup operation, "H" represents a height of said camera, "h" represents a height of said feature point, $\theta 1$ represents a deviation angle of said feature point with respect to said optical axis "C" in said first image pickup operation, and $\theta 2$ represents a deviation angle of said feature point with respect to said optical axis "C" in said second image pickup operation.

20. The processing method for a three-dimensional scope system in accordance with claim 19, further comprising a step of changing a viewpoint to an arbitrary position different from a viewpoint of said camera.

21. The processing method for a three-dimensional scope system in accordance with claim 19, further comprising a step of activating a warning device as a result of a distance measurement based on said three-dimensional coordinate data.

* * * * *